United States Patent
Wang

[19]

[11] Patent Number: 6,097,456
[45] Date of Patent: Aug. 1, 2000

[54] EFFICIENT COLOR DISPLAY USING LOW-ABSORPTION IN-PIXEL COLOR FILTERS

[75] Inventor: Yu Wang, La Crescenta, Calif.

[73] Assignee: California Institute of Technology, Pasadena, Calif.

[21] Appl. No.: 09/133,281

[22] Filed: Aug. 12, 1998

Related U.S. Application Data

[60] Provisional application No. 60/057,150, Aug. 28, 1997, and provisional application No. 60/086,831, May 26, 1998.

[51] Int. Cl.[7] .................................................. G02F 1/1335
[52] U.S. Cl. .............................. 349/105; 349/8; 349/62; 349/71; 349/114; 345/88; 348/744; 359/263; 356/445; 436/525
[58] Field of Search ..................................... 349/105, 114, 349/71, 8, 62; 345/88; 348/744; 359/263; 356/445; 436/525

[56] References Cited

U.S. PATENT DOCUMENTS

| | | | |
|---|---|---|---|
| 4,565,422 | 1/1986 | Seymour et al. | 350/96.1 |
| 4,583,818 | 4/1986 | Chen et al. | 350/96.19 |
| 4,822,144 | 4/1989 | Vriens | 350/339 |
| 4,877,747 | 10/1989 | Stewart | 436/525 |
| 4,882,617 | 11/1989 | Vriens | 358/60 |
| 5,115,336 | 5/1992 | Schildkraut et al. | 359/263 |
| 5,351,127 | 9/1994 | King et al. | 356/445 |
| 5,451,980 | 9/1995 | Simon et al. | 345/88 |
| 5,570,139 | 10/1996 | Wang | 348/744 |
| 5,846,843 | 12/1998 | Simon | 436/527 |

*Primary Examiner*—William L. Sikes
*Assistant Examiner*—Julie Ngo
*Attorney, Agent, or Firm*—Fish & Richardson P.C.

[57] ABSTRACT

A display system having a non-absorbing and reflective color filtering array and a reflector to improve light utilization efficiency. One implementation of the color filtering array uses a surface plasmon filter having two symmetric metal-dielectric interfaces coupled with each other to produce a transmission optical wave at a surface plasmon resonance wavelength at one interface from a p-polarized input beam on the other interface. Another implementation of the color filtering array uses a metal-film interference filter having two dielectric layers and three metallic films.

28 Claims, 4 Drawing Sheets

1. Expose with gray level mask

2. Develop and evaporate second metal layer

3. Expose with gray level mask again

4. Develop and evaporate third metal layer

EFFICIENT COLOR DISPLAY USING LOW-ABSORPTION IN-PIXEL COLOR FILTERS

This application claims the benefit of the U.S. Provisional Application Nos. 60/057,150, filed on Aug. 28, 1997, and 60/086,831, entitled "Liquid crystal display efficiency enhancement by using low absorption in pixel color filters" and filed on May 26, 1998.

ORIGIN OF THE INVENTION

The invention described herein was made in the performance of work under a NASA contract, and is subject to the provisions of Public Law 96-517 (35 U.S.C. 202) in which the Contractor has elected to retain title.

FIELD OF THE INVENTION

The present invention relates to displays having at least one selected color, and more particularly, to a color display based on a combination of a light intensity modulator and a color filter.

BACKGROUND

Liquid crystal displays ("LCDs") are used in many applications, including hand-held devices (i.e., electronic organizers and calculators), portable electronic devices (i.e., laptop computers and camcorders), to large graphic and video displays. A liquid crystal display can be formed of an array of pixel cells each filled with a liquid crystal material. Molecules of a liquid crystal material are rod-shaped and their orientations can be controlled by using an external electric field. This provides a means of modulating the polarization of light that interacts with the liquid crystal material. The intensity of light can thus be modulated with a LCD array by using proper polarizing elements. Hence, a spatial intensity pattern can be achieved in a LCD array by controlling the electric fields in the pixel cells that are illuminated by ambient light or a light beam from a light source.

A color image can be achieved by filtering light with different color filters in adjacent pixel cells of a LCD. For example, many color LCDs group three adjacent pixel cells together to form a single color pixel. Three dye color filters are implemented in the three pixel cells of a color pixel to respectively produce three primary colors, i.e., red, green, and blue. Each dye color filter includes a dye that transmits light of a desired primary color and absorbs light of other colors.

One limitation of the color LCDs with dye color filters is their relatively low efficiency in utilizing the input light. Only about one third of a white beam is actually used for color display. The reset is absorbed by the dye filter. Since polarized light is needed for a LCD array, about one half of an unpolarized input beam is lost in polarizing the input beam. Thus, the maximum light utilization efficiency of such a color LCD is less than $\frac{1}{6}$~17%. This low efficiency significantly reduces the image brightness and increases power consumption for a given light source.

SUMMARY

The present disclosure provides color LCDs based on non-absorbing color filters. Each non-absorbing color filter transmits light of a selected color and reflects other colors. A plurality of different non-absorbing color filters for different colors are formed over a LCD array to produce desired color effects. The reflected light from one color filter is directed back towards the color filters by a reflector and filtered by other color filters before reaching the LCD array. This process of filtering and reflecting re-uses the reflected light and hence significantly increases the efficiency of utilizing input light.

One embodiment of an image display system based on such non-absorbing color filters is formed of a display array (e.g., a liquid crystal array), a light filtering array of non-absorbing color filters and an optical reflector. The display array is configured to have light-modulating pixels to modulate the intensity of light and to produce a spatial pattern indicative of an image. The color filters are formed over the display array and configured to receive and transmit at least one selected spectral component of an input light beam to the display array and reflect other spectral components in the input light beam. The optical reflector is disposed relative to the light filtering array to reflect other spectral components back to the light filtering array so that the light filtering array receives and filters the other spectral components to further illuminate the display array.

The non-absorbing color filters in general may be any non-absorbing color filters such as a multilayer interference filter. One preferred implementation of the filters uses color filters that operate based on surface plasmon waves at a metal-dielectric interface. Another preferred implementation uses thin metal-film interference filter that has three metallic layers and two dielectric layers.

These and other aspects and advantages of the present invention will become more apparent in light of the following detailed description, the accompanying drawings, and the claims.

DETAILED DESCRIPTION OF THE PREFERRED EMBODIMENTS

Color LCDs with non-absorbing color filters are provided to improve the light utilization efficiency. This enhances the display brightness and reduces power consumption. A preferred non-absorbing color filter transmits light of a desired color (i.e., at a desired wavelength or within a certain wavelength range) and reflects other colors. A color filtering array having a plurality of different non-absorbing color filters for different colors is formed over a LCD array to produce desired color effects. The reflected light from one color filter is then directed back to the color filtering array and is filtered by other color filters. This process of filtering and reflecting repeats so that essentially all photons that contribute to the colors for the color display transmit through the color filter array to illuminate the LCD array if other losses are neglected.

Figure 1:
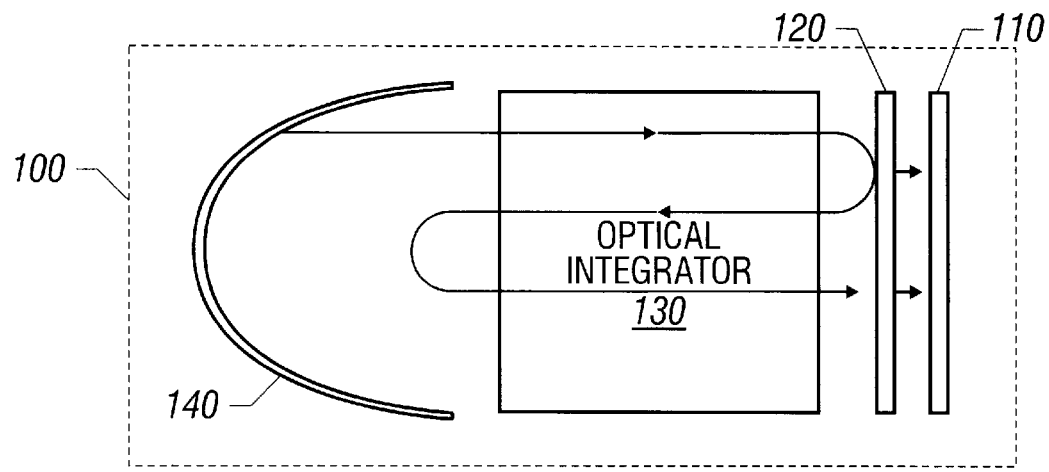
FIG. 1 is a diagram illustrating one embodiment of a color LCD with non-absorbing color filters.

FIG. 1 is a diagram illustrating one embodiment 100 of a color LCD with non-absorbing color filters. A LCD array 110 is formed of LCD pixel cells as an intensity modulator to imprint an image on the illuminating beam. Each LCD pixel cell has electrodes for applying external electric fields. Such a LCD array may be implemented based on known structures and manufacturing methods for LCD arrays.

A color filtering array 120 having different non-absorbing color filters is formed over the LCD array 110 in such a way that each color filter corresponds to a respective LCD pixel cell. Each color filter transmits light of one color and reflects light of other colors. Hence, light received by each LCD pixel cell is filtered to have a desired color.

An optical reflector 140 is disposed relative to the color filtering array 120 to direct the reflected light back to the filtering array 120 so that the reflected light produced by one color filter is re-used by other color filters in the color filtering array 120. The reflector 140 and the color filtering array 120 effects an optical cavity to trap light therein so that photons are bounced back and forth and get reused by different color filters in the color filtering array 120. The effective light intensity within such a cavity can be high and greater than the intensity of an incident light from a light source.

For example, assume an incident white light beam having equal amount of appropriate red, green, blue components. Suppose a ray in this beam initially hits a red color filter in the color filtering array 120. The red component is transmitted through that red color filter. Other color components (i.e., green and blue) are reflected. The reflector 140, if properly configured, can direct the reflected green and blue components back to the color filtering array 120 but to one or more other color filters at different locations. If the other color filter is a green color filter, the green component is transmitted and the blue component is reflected back again to the reflector 140. If the other color filter is another red color filter, both the green and blue components are reflected back. This process continues until the green and/or blue components hit the proper color filters and get transmitted through the color filtering array 120. Hence, all red, green, and blue components are used for display and there is no loss by using the non-absorbing color filtering array 120 in combination with the reflector 140. In comparison, the light utilization efficiency of the system 100 is three times of that of a color LCD based on absorbing dye color filters.

It is desirable in image display to have uniform light illumination to the color filtering array 120 and the LCD array 110. An optical integrator 140 may be optionally placed between the reflector 140 and the coloring filtering 10 array 120 to improve the light intensity uniformity. Many known optical integrators may be used. Preferably, the optical integrator 140 is configured in such way that an entering ray is spread out over the color filtering array 120.

Figure 2:
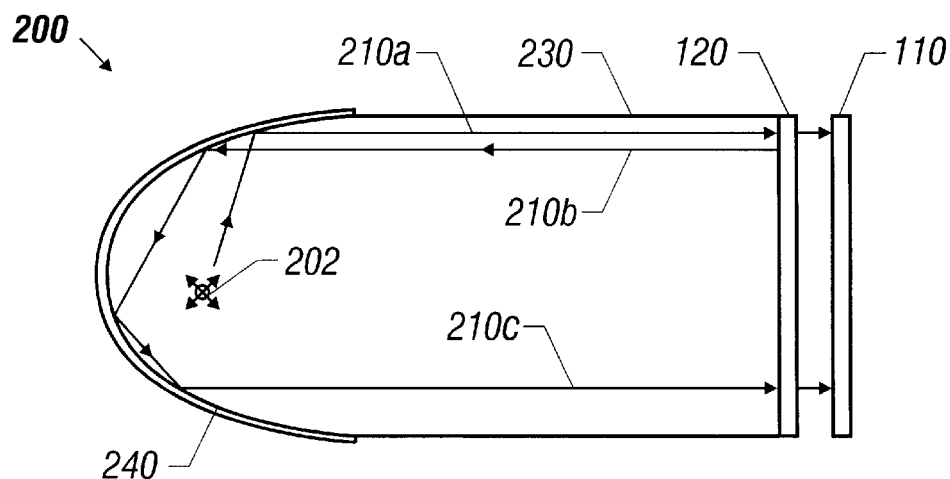
FIG. 2 is a diagram showing one implementation of the LCD display in FIG. 1.

FIG. 2 shows one implementation 200 of the LCD display 100 in FIG. 1. A reflector 240 is a reflector having a curved reflecting surface. The preferred surface has a hyperbolic contour. A light source 202 such as a lamp is placed relative to the reflector 240 to illuminate the color filtering array 120. Preferably, the reflecting surface of the reflector 240 and the location of the light source 202 are configured in such a way that reflected rays (e,g., ray 210a) of the light rays originated from the light source 202 are substantially parallel to one another. An optical integrator 230 is configured and disposed to direct the light to the color filtering array 120.

Reflected light (e,g., ray 210b) from each color filter in the color filtering array 120 is diverged with a relatively small divergence angle due to the divergence in the light produced by the light source 202. The spreading of the reflected light increases with its propagating distance from the filtering array 120. Hence, the optical path length between the reflector 240 and the color filtering array 120 can be set at a desired distance that is sufficiently large to allow the reflected light (e,g., ray 210c) to spread over the entire array of the coloring filtering array 120 after a single reflection. The optical integrator 230, therefore, can simply include an enclosure connecting the reflector 240 and the color filtering array 120 that allows such a desired optical path length.

This desired optical path length is essentially determined by the divergence angle of the reflected beam. Assuming the reflected beam has a full divergence angle of θ upon reflection by the color filtering array 120, the spacing should be about D/(2θ), where D is the aperture dimension of the color filtering array 120. For example, for a 480×640 LCD array of about 2.5 inches in size, the light source 202 can be about 19 cm away from the LCD array when the divergence angle is about 6 degrees and the reflector 240 is placed relative to the light source 202 to project substantially collimated light to the LCD array. The optical path between the reflector and the color filter array may be folded to reduce the required space.

Figure 3A:
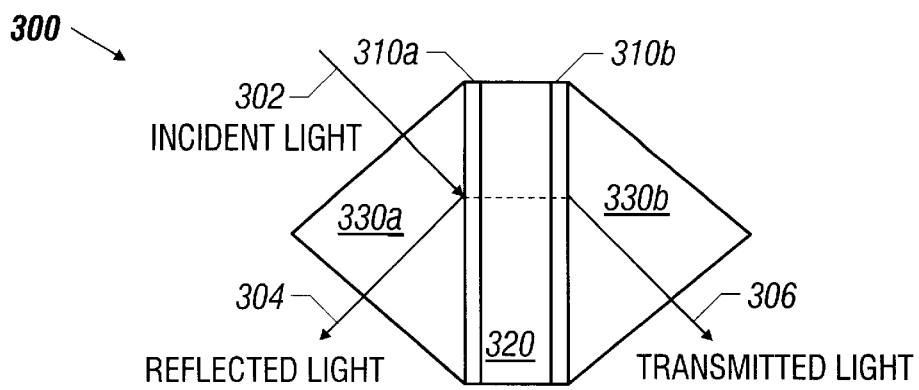
FIGS. 3A, 3B, and 3C are diagrams illustrating examples of non-absorbing color filters based on surface plasmon waves at a metal-dielectric interface.
Figure 3B:
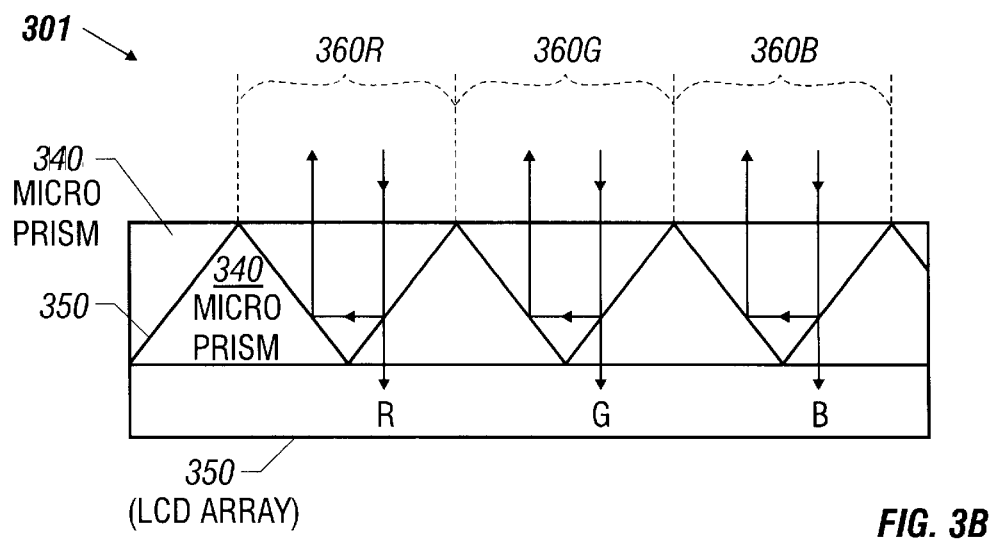
Figure 3C:
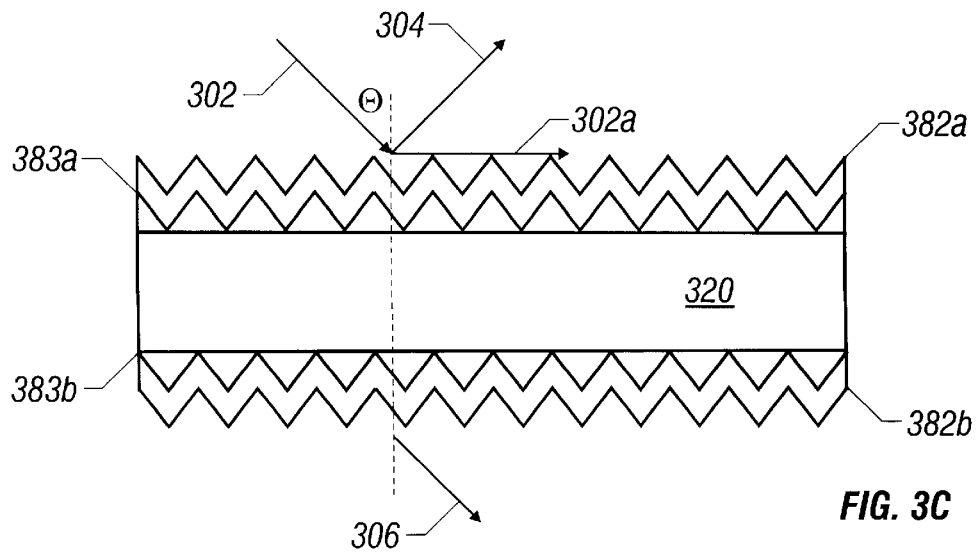

The non-absorbing color filters may be implemented in various forms. FIGS. 3A, 3B, and 3C show examples of such color filters based on surface plasmon waves at a metal-dielectric interface. Transmissive surface plasmon filters have been disclosed in, for example, U.S. patent application No. 08/949,151 filed on Oct. 10, 1997, the disclosure of which is incorporated herein by reference.

Surface plasmon are oscillations of free electrons caused by resonant absorption of a p-polarized incident optical wave at a metal-dielectric interface when the wavelength and incident angle of the optical wave satisfy a plasmon resonance condition. The metal material in general has a negative dielectric constant and the dielectric material has a positive dielectric constant. The electrical field of the p-polarized component at non-normal incidence induces electric dipoles in a metallic layer that forms one side of a metal-dielectric interface based on the excitation of the free electrons in the metal. The direction of the induced dipoles is perpendicular to the metal-dielectric interface. The radiation of the dipoles generates a surface plasmon wave with a wave vector parallel to the interface. The strength of the surface plasmon wave is maximal at the metal-dielectric interface and decays exponentially on both sides of the interface.

The energy conversion from the incident light to the surface plasmon wave is maximal when the incident angle, wavelength of the incident light, the dielectric constants of the metal and the dielectric materials satisfy a surface plasmon resonance condition. In general, this resonance condition relates to mode matching between the p-polarized incident light and the surface plasmon wave at a metal-dielectric interface and may vary with the specific incident coupling mechanism and the structure of the interfaces (e.g., a single interface or two closed coupled interfaces).

One embodiment of the transmissive surface plasmon filter includes a dielectric layer sandwiched between two metallic layers. This forms two closely spaced symmetrical metal-dielectric interfaces. The optical thickness of the dielectric layer is configured to allow for excitation of surface plasmon waves on both metal-dielectric interfaces by an input optical wave. The dielectric layer may be sufficiently thin (e.g., less or larger than one wavelength but in general on the order of one wavelength) to allow for electromagnetic energy coupling between the two metallic layers. The coupling between the surface plasmon waves produces a reflected wave and a transmitted wave that have mutually complimentary colors.

The surface plasmon resonance frequency is set by adjusting the optical thickness of the dielectric layer. Either the thickness or the index of the refraction of the dielectric layer may be adjusted to change the wavelength (i.e., color) of the transmitted light. Such a surface plasmon filter may be configured to have a large tunable range and bandwidth, a simple structure, and light weight.

FIG. 3A shows one implementation 300 of a surface plasmon filter with two coupled symmetrical metal-dielectric interfaces. A dielectric layer 320 is sandwiched between two substantially identical metallic layers 310a, 310b to form two closed spaced metal-dielectric interfaces. In general, any dielectric material may be used to form the layer 320, including air and an electro-optic material including inorganic crystals. Two prisms 330a, 330b each have an index of the refraction larger than that of the dielectric layer 320. These prisms are respectively formed over the metallic layers 310a, 310b in order to properly couple an input optical beam 302 to excite surface plasmon waves. The prisms 330a, 330b may be formed of a high-index material, e.g., a high-index glass or $TiO_2$, to couple the input optical wave 302 at a specified incident angle. In general, the incident angle of the input optical wave 302 to the interface of the metallic layer 310a and dielectric layer 320 is larger than the critical angle for total reflection defined the high-index layer 310a (or 310b) and the dielectric layer 320.

The metallic layers 310a and 310b are sufficiently thin so that evanescent electromagnetic waves caused by the incident wave 302 can penetrate therethrough. In general, the thickness of the metallic layers 310a and 310b may be any value. However, the preferred thickness is from about 5 nm to about 150 nm and most preferably from about 10 nm to about 100 nm. A variety of metals may be used for forming the layers 310a and 310b, including but not limited to, Ag, Al, Au, K, and Li.

At the resonance condition, the incident optical wave 302 excites a surface plasmon wave at the interface of the metallic layer 310a and the dielectric layer 320. The oscillating free electrons in the first metallic layer 310a generate an evanescent optical wave at the wavelength of the absorbed resonant photons. The field of the evanescent optical wave penetrates the thin dielectric layer 320 to reach the second metallic-dielectric interface formed by the dielectric layer 320 and the metallic layer 310b. The field of the evanescent optical wave can excite a second surface plasmon wave on the second interface 310b. The second surface plasmon wave is substantially identical to the first surface plasmon wave including the frequency and the plasmon wave vector. The oscillating free electrons in the second metallic layer 310b radiate photons in the same direction and at the same frequency as the absorbed resonant photons at the first metallic layer 310a. The radiated photons exit the second metallic layer 310b as a transmitted wave 306 which is substantially parallel to the input beam 302.

Therefore, for an incident light with a broad spectrum, the filter 300 of FIG. 3A will couple the spectral component that satisfies the surface plasmon resonance condition to the second interface 310b as the transmitted wave 306 and reflects the rest of the input light as the reflected wave 304. In particular, a white input beam may be split into a colored transmitted beam 306 and a reflected beam 304 which is spectrally complimentary to the transmitted beam 306.

For a given incident angle of the input optical wave 302, the optical thickness of the dielectric layer 320 may be adjusted to achieve excitation of the surface plasmon waves at different wavelengths to effect color filtering in both transmitted beam 306 and the reflected beam 304. The optical thickness of the dielectric layer 320 is the product of its index of refraction and the layer thickness. Therefore, the thickness of the dielectric layer 320, or the index of refraction, or both may be varied in order to select different wavelengths for transmission. To change the index of refraction of the layer 320, a liquid crystal material or an electro-optic crystal may be used to form the layer 320 and an external electric field is applied to the metallic layers 310a, 310b to change the index.

FIG. 3B shows a portion of a color filtering array 301 formed on a LCD array panel 370 using surface plasmon filters of FIG. 3A. Micro prisms 340 and a metal-dielectric-metal layer 350 with a varying dielectric thickness are used. Different values in the dielectric thickness are configured to produce different colors in the transmitted light as desired. For example, three adjacent sections 360R, 360G, and 360B are configured to transmit three additive primary colors red, green, and blue, respectively. The miroprisms 340 may be formed to have a prism angle of 45° as shown.

Alternatively, a grating may also be used to substitute the coupling prism. FIG. 3C shows an implementation of such embodiment. Two substantially identical gratings 382a and 382b are each coated with a layer of metal film (383a and 383b) to form the metal-dielectric interfaces. The gratings 382a and 382b are configured to produce a diffracted order 302a of the incident light 302 to have a wave vector parallel to the metal-dielectric interfaces. For example, the first-order diffraction beam may be used as the beam 302a to excite a surface plasmon wave and the zero-order diffraction beam is reflected as the beam 304. Similar to the embodiment 300 of FIG. 3A, the coupling between the two symmetric interfaces produces the transmitted beam 306. A color filtering array can be constructed using such a grating-based surface plasmon filter.

The gratings 382a and 382b may be implemented in a number of ways. For example, one way is to attach a separately-formed grating to the dielectric layer 320; another way is to directly form a coupling grating on the dielectric layer 320. Another way is to etch a grating on the surface of the dielectric layer. The gratings 382a and 382b in first two examples are preferably made of a transparent material in the operating spectral range.

Figure 4A:
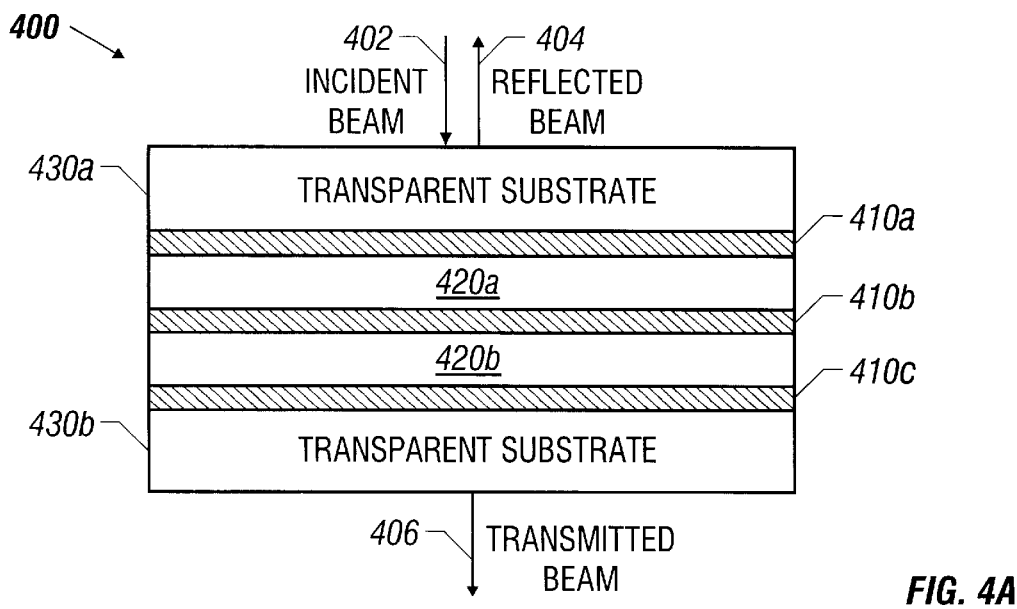
FIG. 4A is a diagram showing a color metal-film interference filter that has three metallic layers and two dielectric layers.

Another embodiment of the non-absorbing color filters is a metal-film interference filter. See, U.S. Provisional Application No. 60/057,150, which is incorporated herein by reference. FIG. 4A shows a color metal-film interference filter 400 with three metallic layers 410a, 410b, 410c and two dielectric layers 420a, 420b. Each of the metallic layers 410a, 410b, 410c is preferably formed of such a thin metallic film that it is optically transparent in the visible spectral range from about 400 nm to about 750 nm. For example, thin gold or silver films may be used. In one embodiment, a silver film less than about 40 nm thick is used. The dielectric layers 420a and 420b are configured to have different thicknesses for transmitting different colors and may be formed of such materials like $MgF_2$, $SiO_2$, NaF, or LiF. The thickness of the metallic films 410a, 410b, and 410c can be the same for transmitting different colors. Transparent substrates 430a and 430b (e.g., formed of a glass) are used to protect the multi-layer stack. Similar to the surface plasmon filters, the color of the transmitted light 406 of an incident beam 402 (e.g., a white color) is complementary to the color of the reflected beam 404.

Figure 4B:
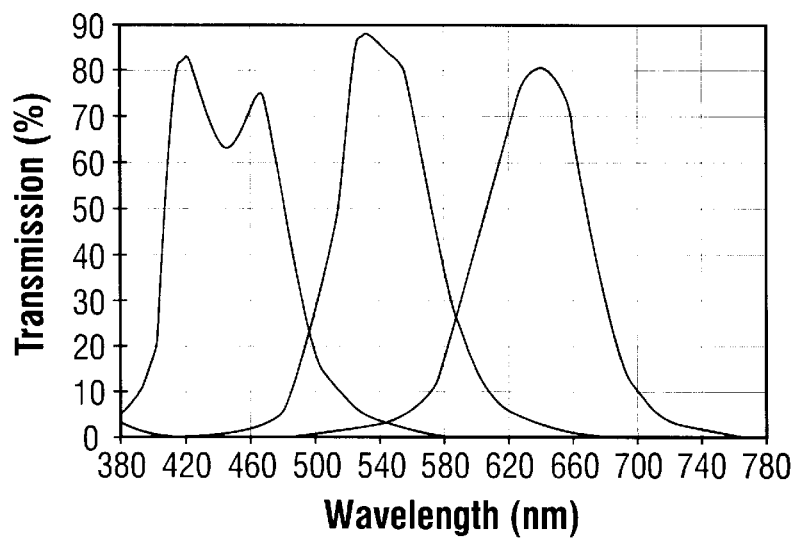
FIGS. 4B and 4C are plots respectively showing measured transmission and reflection spectra of three $MgF_2$-Ag metal-film interference filters with different thickness values for the $MgF_2$ dielectric layers to produce red, green, and blue filters.
Figure 4C:
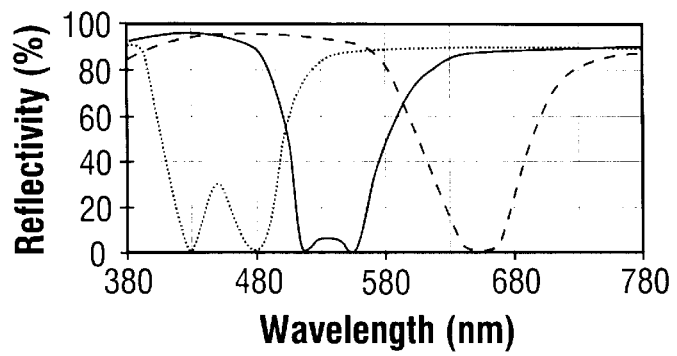
Figure 5A:
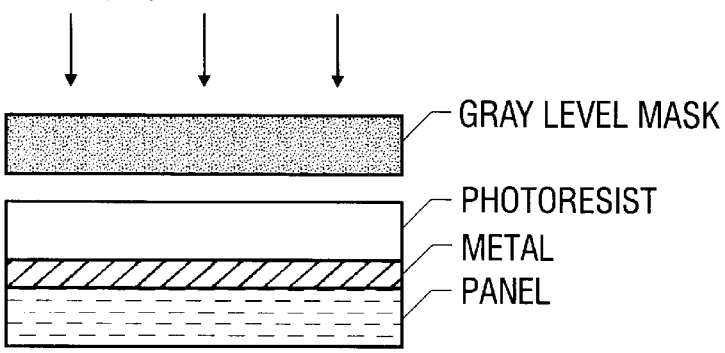
FIGS. 5A, 5B, 5C, and 5D are diagrams illustrating steps of fabrication of a color filtering array with filters for red, green, and blue colors.
Figure 5B:
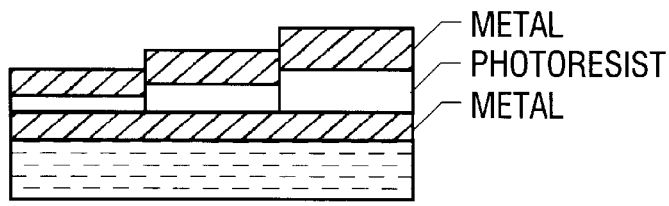
Figure 5C:
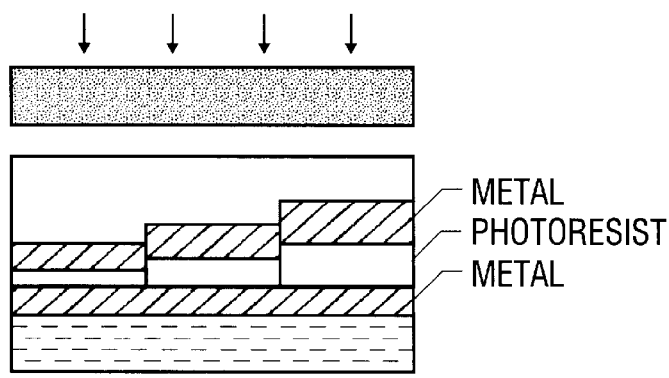
Figure 5D:
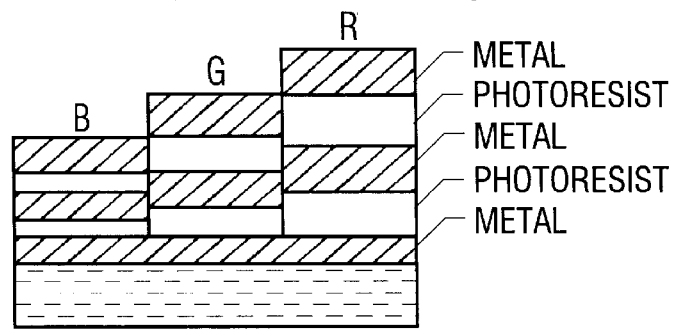

FIG. 4B shows measured transmission spectra of three $MgF_2$—Ag metal-film interference filters with different thickness values for the $MgF_2$ dielectric layers to produce red, green, and blue filters. The structures of the three filters are listed in Table 1. As the thickness of both $MgF_2$ layers changes from 110 nm, to 150 nm, and to 185 nm, the wavelength of the peak transmission changes from 420 nm (blue), to 540 nm (green), and to 640 nm (red), respectively. A relatively high transmission of above 80% can be achieved in all three colors. FIG. 4C shows the spectra of the reflected light. The bandwidth of each transmission peak is about 100 nm, which is desirable for display applications.

TABLE 1

|  | Ag | $MgF_2$ | Ag | $MgF_2$ | Ag |
| --- | --- | --- | --- | --- | --- |
| Blue Filter | 23 nm | 110 nm | 40 nm | 110 nm | 23 nm |
| Green Filter | 23 nm | 150 nm | 40 nm | 150 nm | 23 nm |
| Red Filter | 23 nm | 185 nm | 40 nm | 185 nm | 23 nm |

The 5-layer metal film interference filters are easy to fabricate since only the thicknesses of the dielectric layers need to be changed for transmitting different colors and the metal films can be the same. The dielectric layers may be formed with a photoresist material. FIGS. 5A, 5B, 5C, and 5D show steps of fabrication of a color filtering array with filters for red, green, and blue colors. A mask with a varying gray level can be used to achieve different thickness values of a common photoresist layer for different color filters.

Although the present invention has been described in detail with reference to a few preferred embodiments, various modifications and enhancements may be made. For example, the optical integrator 130 of FIG. 1 may be implemented with different configurations.

A transparent rod may be configured with a desired aspect cross sectional ratio and length to function as an optical integrator. Such a rod may be hollow with reflective surfaces or solid. The aspect ratio should be the same as the size of the LCD array. Increasing the length of the rod with respect to the dimension of the cross section can increase the number of reflections within the rod. This improves the uniformity of the beam.

An optical integrator can also be formed by using two lenslet arrays each having lenslets of the same focal length. The two lenslets arrays can be spaced from one another by the focal lens of the lenslets so that the input lenslet array images the light source onto the output lenslet array. An auxiliary lens can be coupled to the output facet of the output lenslet array so that the input lenslet array is imaged onto the LCD array. In this embodiment, increasing the number of lenslets can improve the uniformity of the beam.

In addition, a fiber bundle integrator can also be used. See, for example, Cheng and Chen, SPIE Proceedings 2407 on Projection Displays, 1995, pp. 12–22.

A non-absorbing color filtering array can be configured to produce a monochromatic display with a desired color. All filters in the array can be the same type for transmitting that desired color.

As another variation, conventional dielectric interference filters with multiple dielectric layers can be used to serve as the non-absorbing color filters.

Furthermore, although a 5-layer metal film interference filter is described, other metal film interference filters may also be used. For example, a 3-layer metal film filter having a single layer of dielectric layer sandwiched between two metal films can also used.

These and other variations and modifications are intended to be encompassed by the appended claims.

What is claimed is:

1. An image display system, comprising:
    a display array having light-modulating pixels, each configured to modulate an intensity of light illuminating said display array to produce a spatial pattern indicative of an image to be displayed;
    a light filtering array of optical filters formed over said display array, each optical filter configured to receive and transmit at least one selected spectral component of an input light beam to a respective light-modulating pixel in said display array and reflect other spectral components that are different from said at least one spectral component in said input light beam; and
    an optical reflector disposed relative to said light filtering array and configured to reflect said other spectral components back to said light filtering array so that said light filtering array receives and filters said other spectral components to further illuminate said display array.

2. The system as in claim 1, wherein said display array is a liquid crystal display array and each of said light-modulating pixels includes a liquid crystal material.

3. The system as in claim 1, wherein each of said optical filters in said light filtering array comprises:
    a dielectric layer having a first side and an opposite second side and comprising a first dielectric material with a first dielectric constant and a first predetermined thickness; and
    first and second metallic films each having a second dielectric constant and a second predetermined thickness, said metallic films respectively formed on the opposite sides of said dielectric layer to form first and second metal-dielectric interfaces which are substantially symmetric with respect to said dielectric layer,
    wherein said dielectric layer, said first and second metallic films are configured to respectively support surface plasmon waves at said first and second metal-dielectric interfaces and said dielectric layer is operable to transfer said selected spectral component in a p-polarized input electromagnetic wave from said first side of said dielectric layer to said second side.

4. The system as in claim 3, wherein each of said optical filters in said light filtering array further comprises:
    a first coupling element, formed on said first metallic film and configured to couple the p-polarized input electromagnetic wave into said first surface plasmon mode at said fist metal-dielectric interface; and
    a second coupling element substantially identical to said first light coupling element and formed on said second metallic film and configured to couple the energy of said selected spectral component to an output electromagnetic wave.

5. The system as in claim 4, wherein said first and second coupling elements comprise prisms which are made of a dielectric material having a dielectric constant higher than said first dielectric constant of said dielectric layer.

6. The system as in claim 4, wherein said first and second coupling elements comprise diffraction gratings.

7. The system as in claim 3, wherein an optical thickness of said dielectric layer is set at a value in a relation with respect to a wavelength of said selected spectral component.

8. The system as in claim 1, wherein each of said optical filters in said light filtering array comprises:
- a first metallic layer configured to be optically transparent to said input light beam;
- a first dielectric layer formed on said first metallic layer; and
- a second metallic layer formed on said first dielectric layer and configured to be optically transparent to said input light beam.

9. The system as in claim 8, wherein said first and second metallic layers are formed of gold or silver.

10. The system as in claim 8, wherein each of said optical filters in said light filtering array further comprises:
- a second dielectric layer formed on said second metallic layer; and
- a third metallic layer formed on said second dielectric layer and configured to be optically transparent to said input light beam,
- wherein said first and second dielectric layers are configured to allow for transmission of said selected spectral component.

11. The system as in claim 10, wherein said first, second and third metallic layers are less than about 40 nm thick and greater than zero.

12. The system as in claim 10, wherein said first and second dielectric layers are formed of a photoresist.

13. The system as in claim 10, wherein said first and second dielectric layers are formed of $MgF_2$, $SiO_2$, NaF, or LiF.

14. The system as in claim 1, wherein each of said optical filters in said light filtering array comprises an interference filter having a plurality of dielectric layers.

15. A system as in claim 1, wherein said optical reflector is spaced from said light filtering array and said display array by an optical path that allows a reflected beam from each optical filter to diverge and to fill the entirety of said light filtering array upon a single reflection by said optical reflector.

16. A system as in claim 1, wherein said optical reflector is spaced from said light filtering array by $D/2\theta$, where D is the dimension of said light filtering array and $\theta$ is a full divergence angle of a reflected beam from each optical filter.

17. An image display system, comprising:
- a display array having liquid crystal pixels, each configured to modulate an intensity of light illuminating said display array to produce a spatial pattern indicative of an image to be displayed;
- a light filtering array formed over said display array and configured to have thin-film optical filters, each comprised of a first metallic layer optically transparent to said light, a first dielectric layer formed on said first metallic layer, a second metallic layer formed on said first dielectric layer and configured to be optically transparent to said light, a second dielectric layer formed on said second metallic layer, and a third metallic layer formed on said second dielectric layer and configured to be optically transparent to said input light beam, wherein each thin-film optical filter is operable to receive and transmit at least one selected spectral component of said light beam to a respective light-modulating pixel and reflect other spectral components in said light; and
- an optical reflector disposed relative to said light filtering array and configured to reflect said other spectral components back to said light filtering array so that said light filtering array receives and filters said other spectral components to further illuminate said display array.

18. A system as in claim 17, wherein said optical reflector is spaced from said light filtering array and said display array by an optical path that allows a reflected beam from each optical filter to diverge and to fill the entirety of said light filtering array upon a single reflection by said optical reflector.

19. An image display system, comprising:
- a display array having liquid crystal pixels each configured to modulate an intensity of light illuminating said display array to produce a spatial pattern indicative of an image to be displayed;
- a light filtering array formed over said display array and configured to have a plurality of optical filters respectively to transmit filtered light to said light-modulating pixels, each optical filter comprised of a dielectric layer having a first side and an opposite second side and comprising a first dielectric material with a first dielectric constant and a first predetermined thickness, and first and second metallic films each having a second dielectric constant and a second predetermined thickness, said metallic films respectively formed on opposite sides of said dielectric layer to form first and second metal-dielectric interfaces which are substantially symmetric with respect to said dielectric layer, wherein said dielectric layer, said first and second metallic films are configured to respectively support surface plasmon waves at said first and second metal-dielectric interfaces and said dielectric layer is operable to transmit a selected spectral component in a p-polarized input electromagnetic wave in said light from said first side of said dielectric layer to said second side and reflect other spectral components in said light; and
- an optical reflector disposed relative to said light filtering array and configured to reflect said other spectral components back to said light filtering array so that said light filtering array receives and filters said other spectral components to further illuminate said display array.

20. A system as in claim 19, wherein said optical reflector is spaced from said light filtering array and said display array by an optical path that allows a reflected beam from each optical filter to diverge and to fill the entirety of said light filtering array upon a single reflection by said optical reflector.

21. A method for forming a color representation of an image, comprising:
- (1) filtering an input beam to transmit at least a first selected spectral component of said input light beam and to reflect other spectral components;
- (2) modulating an intensity of said first selected spectral component to imprint a first color component for one image pixel of an image thereon to be displayed;
- (3) filtering other spectral components to transmit at least a second selected spectral component and to reflect remaining spectral components;
- (4) modulating an intensity of said second selected spectral component to imprint a second color component for said one image pixel of said image; and
- (5) repeating (1)–(4) to form at least said first and second color components for other image pixels of said color representation of said image.

22. A method as in claim 21, further comprising reflecting each reflected beam after said filtering step to allow each reflected beam to be filtered and modulated at least one more time to form a color component for at least another image pixel of said image.

23. A color display system, comprising:
- a plurality of light-modulating pixels forming a display array, each pixel configured to modulate an intensity of light illuminating said display array to produce a spatial pattern indicative of an image to be displayed, wherein three adjacent light-modulating pixels respectively modulate beams of three different colors to form one color pixel for said image;
- a light filtering array of optical filters formed over said display array, each optical filter configured to receive and transmit a selected spectral component of an input light beam to a respective light-modulating pixel in said display array and reflect other spectral components that are different from said at least one spectral component in said input light beam, wherein three adjacent optical filters belonging to one color pixel are configured to respectively to transmit three different colors; and
- an optical reflector positioned to receive and reflect reflected beams from said light filtering array back to said light filtering array so that each reflected beam diverges to fill said light filtering array upon a single reflection.

24. A system as in claim 23, further includes an optical integrator between said optical reflector and said light filtering array.

25. A system as in claim 24, wherein said optical integrator include a transparent rod.

26. A system as in claim 24, wherein said optical integrator includes two lenslet arrays of a common focal length.

27. A system as in claim 24, wherein said optical integrator includes a fiber bundle.

28. A system as in claim 23, wherein said display array includes a LCD panel.

* * * * *